Sept. 13, 1960    C. O. FINN    2,952,492
BEATER AND FEEDER FOR AUTOMATICALLY CONTROLLING DELIVERY
OF MULCH FIBRES TO A BLOWER
Filed June 6, 1958    2 Sheets-Sheet 1

INVENTOR.
Charles O. Finn
BY Gerald B. Tjoflat
His Attorney

Sept. 13, 1960 C. O. FINN 2,952,492
BEATER AND FEEDER FOR AUTOMATICALLY CONTROLLING DELIVERY
OF MULCH FIBRES TO A BLOWER
Filed June 6, 1958 2 Sheets-Sheet 2
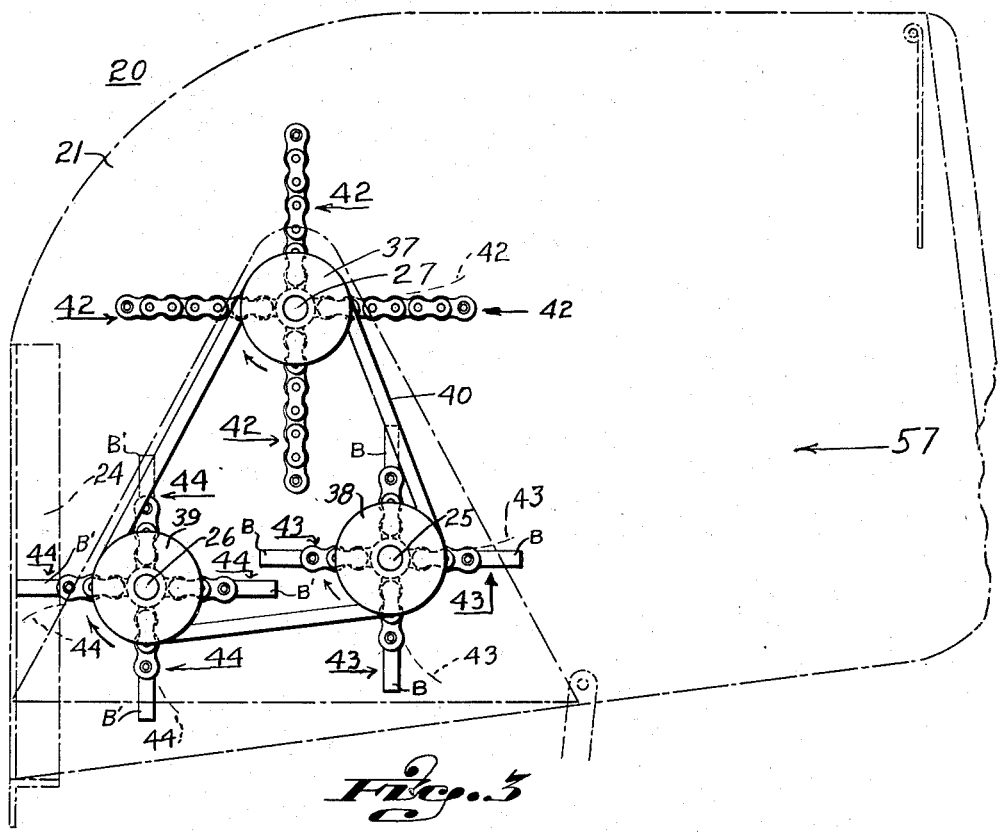
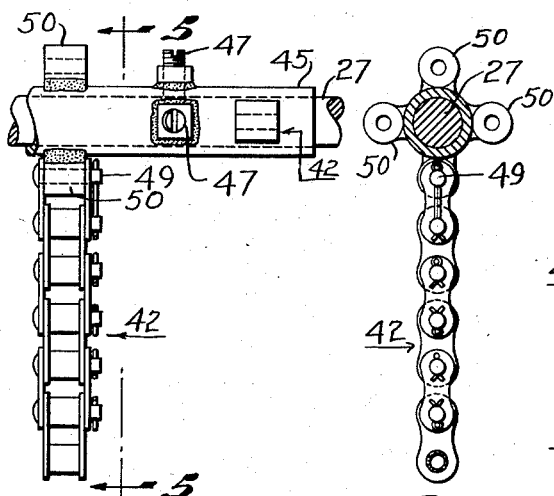
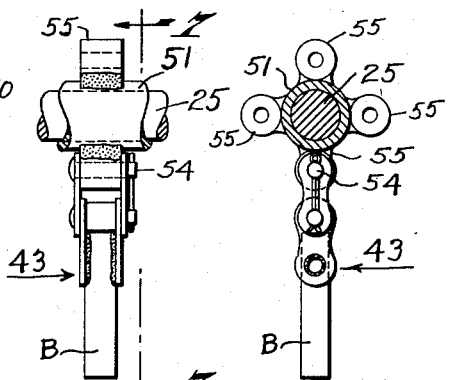
INVENTOR.
Charles O. Finn
BY Gerald B. Tjoflat
His Attorney

United States Patent Office 2,952,492
Patented Sept. 13, 1960

2,952,492

BEATER AND FEEDER FOR AUTOMATICALLY CONTROLLING DELIVERY OF MULCH FIBRES TO A BLOWER

Charles O. Finn, Cincinnati, Ohio, assignor to The Finn Equipment Company, Cincinnati, Ohio, a corporation of Ohio Filed June 6, 1958, Ser. No. 740,281

14 Claims. (Cl. 302—36)

This invention relates to beater-feeders for separating and feeding mulch fibres into the inlet or intake of mulch blowers.

Mulch blowers as heretofore constructed have been provided with rigid beater and feeder bars mounted on rotating shafts. When mulch fibre, usually in the form of bales of straw, hay and the like, was dry and easily separated, the blowers operated without difficulty and without plugging at the inlet or intake therefor; but when the mulch bales were wet, as was often the case, there was a decided tendency to plugging. Consequently, the mulch was not uniformly discharged by such blowers. Oftentimes the mulch was blown out in intermittent clumps or bunches. Consequently the mulch as deposited on the soil areas was not efficiently distributed and produced an unsightly appearance as well.

Furthermore, plugging at the inlet of a blower results in considerable loss of time because of the frequent stoppages required to manually clear out the blower inlet and sometimes the impeller thereof.

An object of this invention is to provide a beater-feeder for mulch blowers that avoids plugging and which automatically stops feeding when mulch accumulates beyond a certain amount in the blower inlet.

A further object of the invention is to provide the usual beater and feeder shafts of blowers with flexible instead of rigid members which are held in operative position by centrifugal force when feeding is normal, but which, when the entrance to the blower becomes plugged by the accumulation of mulch fibre, deflect and assume shorter and shorter radii, depending upon the extent of accumulation, thereby either reducing or stopping the feed automatically.

A still further object of the invention is to provide a beater and feeder for mulch fibre blowers as above set forth in which the rate of feed is controlled automatically by the resistance of mulch fibre to the beater and feeder elements as the fibres accumulate at the entrance to the blower or the outlet of the feeder.

A still further object is to provide a beater-feeder for supplying fibres to a blower in a separated, loose condition and at a rate that is automatically controlled by the resistance of the fibres to separation and to the accumulation of fibres at the blower inlet.

The above and other objects of the invention will be apparent to those of ordinary skill in the art to which the invention pertains from the following description taken in conjunction with the accompanying drawings.

In the drawings:

Fig. 3 is a view in side elevation of the device as shown in Fig. 2;

Fig. 4 is a partial view in side elevation of a shaft having a flexible feeder-beater element mounted thereon;

Fig. 5 is a view in section taken on line 5—5 of Fig. 4;

Fig. 6 is a view in elevation of a flexible member mounted on a shaft in the beater and feeder which is provided with a rigid bar at the outer end of the flexible member; and Fig. 7 is a view in section taken on line 7—7 of Fig. 6.

Figure 1:
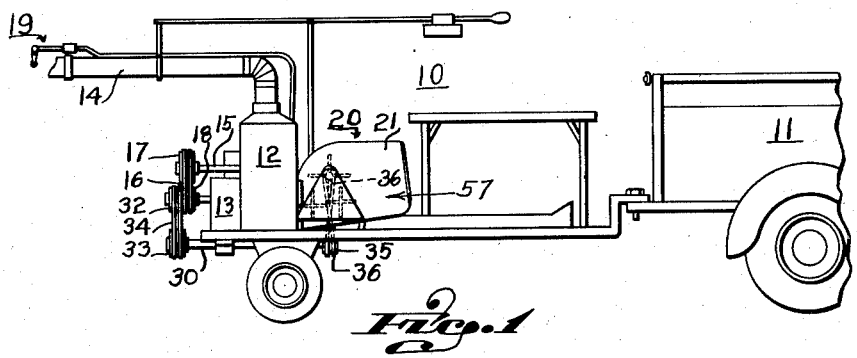
Figure 1 is a more or less schematic view of a mulch spreader provided with a beater and feeder arranged and constructed in accordance with an embodiment of the invention.

In Fig. 1 of the drawings a mulch spreader 10 is shown in more or less schematic form. It may be coupled to a truck 11 or other vehicle and pulled along a course, a road side for example, or over a field, or wherever it is desired to cover soil with mulch.

The mulch spreader 10 may be of the type shown and used for the purposes stated in Patent No. 2,842,897 granted July 15, 1958, on my application Serial No. 373,563, filed August 11, 1953.

The mulch spreader comprises a blower 12 driven by a suitable motor or engine 13, that discharges into a swingable spreader or blower pipe 14. The impeller shaft 15 of the blower is driven by belts 16 running on pulleys 17 and 18 secured to the impeller and motor shafts, respectively.

The pipe 14 may be raised or lowered and swung from side to side manually to give direction to the mulch discharging therefrom. At or near the discharge end of the pipe 14 is a means 19 for spraying an adhesive into the air stream by which the mulch is carried, thereby spotting the fibres with adhesive and causing them to adhere one to another on the ground.

The mulch may consist of baled straw, hay or other fibre. The bales are delivered to beater-feeder 20 in which the fibres are separated and fed to the intake of the blower. Heretofore, such beater-feeder devices utilized solid, rigid beater and feeder bars. They operated quite satisfactorily at times, provided the fibres were sufficiently dry to be readily and uniformly separated. But, as those beater and feeder bars were rigid, the tendency was to continue beating and feeding at the same rate even though the blower intake was quite plugged or overloaded, thereby aggravating the situation. Consequently the mulch spreader would have to be stopped and the blower intake and sometimes the blower itself cleaned out by hand. Even before plugging was complete, the fibres were often as not, fed in clumps or slugs and discharged in that form by the blower pipe. Consequently, the mulch fibres were not uniformly distributed over the soil areas. In addition the mulched areas were rendered unsightly by these clumps until they had been settled down by repeated rains.

The beater-feeder 20 of this invention is automatic in its feeding and beating operation so that as soon as fibre accumulates beyond a certain amount at the blower intake, feeding is decreased and under certain conditions arrested until the blower has succeeded in clearing the inlet. As the intake is cleared out, feeding of fibre resumes automatically.

Figure 2:
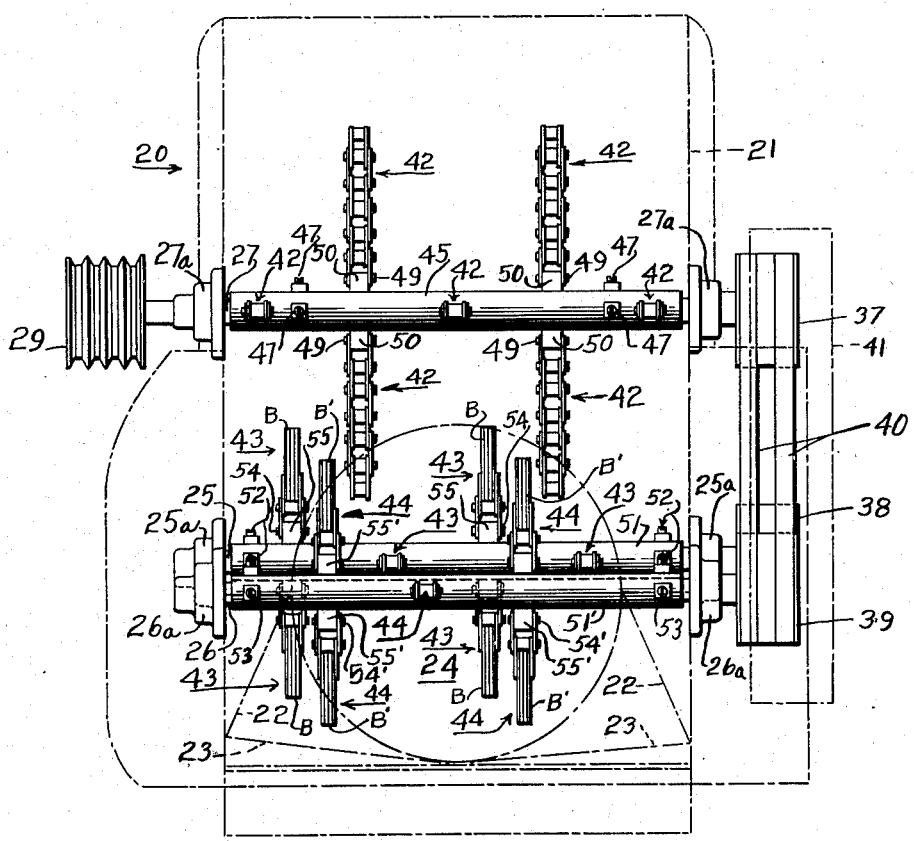
Fig. 2 is an enlarged end view in front elevation of the beater and feeder of Fig. 1, the feeder housing being shown in dot-dash lines.

Device 20 is shown to an enlarged scale in Figs. 2 and 3. It comprises a housing 21 (the housing being shown in ghost lines in Figs. 2 and 3) having at its discharge end a throat composed of side plates 22 and a bottom plate 23 that converge towards and terminate at the edge of the inlet 24 of the blower 12. The housing supports transversely extending shafts 25, 26 and 27, the shafts being journaled in bearings 25a, 26a and 27a, respectively, carried by the side walls of the housing. As arranged, the ends of the shaft are located at the corners of a triangle.

The shaft 27 is provided with a pulley 29 driven by the motor shaft through a jack shaft 30. As shown, in Fig. 1, the drive from the motor to the jack shaft 30 is by means of pulleys 32 and 33 and a belt 34, and from the jack shaft to pulley 29 by means of a pulley 35 and a belt 36. The opposite end of shaft 27 and the corresponding ends of shafts 25 and 26 are provided with pulleys 37, 38 and 39, respectively, over which a belt 40 runs. The pulleys and belt are enclosed by a guard 41. Thus, the shafts 25—27 are driven in the same direction.

Each of the shafts 25—27 is provided with flexible members 42, 43, and 44, respectively, the members 43 and 44 being preferably of identical construction as shown in Figs. 6 and 7. The flexible members are held in operative position, that is, at substantially right angles to their respective shafts, by centrifugal force, as shown. When mulch accumulates at the blower inlet, or the bales of mulch are quite hard, they bend or deflect. The amount of bending or deflection is proportional to the resistance offered at contact with the mulch fibres at any given rotational speed of the shafts on which the flexible members are mounted.

Members 42 are arranged in diametrically opposed pairs, there being five such pairs for shaft 27. They are secured to a sleeve 45 through which shaft 27 extends and to which the sleeve is secured in any suitable manner, as by means of set screws 47. The flexible members 42 are preferably composed of lengths of standard chain, such as roller chain, for example, as the latter is strong and durable and the links are relatively freely rotatable on their connecting link pins. These links of chain are attached by pins 49 to lugs 50 which are welded or otherwise suitably secured to sleeve 45.

The flexible members 43 and 44 are connected to sleeves 51 and 51' through which the respective shafts 25 and 26 extend and to which they are secured in any suitable manner as by means of set screws 52 and 53, respectively. Figs. 6 and 7 illustrate in more detail the construction and the mountings for the flexible members 43. As the construction and mountings of the members 44 are shown as identical to the construction and mountings for the members 43, the same reference characters will be applied to similar and corresponding partss of the members 44 but with primes affixed.

The shafts 25 and 26, being relatively close to the bottom of the housing 21, the flexible members 43 and 44 are shorter than members 42 and of different construction. Each of members 43 comprises several links of chain, preferably roller chain, for reasons stated supra, and a relatively short, rigid bar B which is pin-connected to the outermost link. Each of the innermost links is attached by means of a pin 54 to a lug 55 secured as by welding or other suitable means to sleeve 51.

The flexible members 43 are arranged in diametrically opposed pairs, there being four pairs so spaced along the shaft as to clear the members 42 and 44, see Fig. 2.

The flexible members 44 are also arranged in diametrically opposed pairs on their sleeve 51', there being three such pairs as shown. Adjacent pairs of members 43 and 44 are relatively close to each other and the outermost pairs of members 44 are relatively close to the outermost pairs of members 42. The arrangement of the spacing of members 42—44 may be modified to suit requirements and need not be arranged as shown, necessarily. Furthermore, there may be a greater or lesser number of flexible members on each of the rotating shafts according to the size of the machine with which they are used.

The shafts on which members 42—44 are mounted rotate in the direction indicated by the arrows in Fig. 3. So long as they do not meet with substantial resistance or no resistance at all, they are maintained by centrifugal force at substantially right angles to their respective shafts.

However, as the bale of fibre is moved into the housing 21, the feed being in the direction of arrow 57, the flexible members meet with resistance of greater or lesser magnitude as they separate and feed the fibres to the blower intake. As that resistance increases, the flexible members deflect as indicated generally by the dot-dash lines at the bale location and at the intake to the blower, also along the bottom of the housing in the event that there is an accumulation of fibres on the same.

When the fibres accumulate faster at the intake 24 than the blower suction can take them away, the flexible members 44 deflect and foreshorten, thereby decreasing the rate of feed. Likewise, the accumulation of fibres between the members 42 and 43 will cause them to deflect and decrease their ability to advance fibre to the blower intake. Thus, by decreasing the rate of feed to the blower intake, the blower can work on the accumulation and deliver it to the pipe 14, thus unloading the blower intake. As the accumulation at the intake and therefore the resistance confronted by any or all of the flexible members 42—44 decreases, centrifugal force causes them to automatically resume beating and feeding at a higher rate.

By means of the beater-feeder device above described, mulch can be fed more uniformly to the blower without plugging the intake or the impeller of the blower. The mulch is thereby more uniformly distributed over soil areas. Furthermore, by obviating the plugging problem and automatically regulating the feed and beating rate of the device, more bales of mulch can be spread per hour or during any given period of time, because the machine does not have to be shut down more or less frequently to clear the blower intake and the blower of excessive accumulation.

Having thus described the invention, it will be apparent to those of ordinary skill in the art, that various modifications and changes may be made in the illustrated embodiment without departing from either the spirit or the scope of the invention.

Therefore, what is claimed as new and desired to be secured by Letters Patent is:

1. A feeder-beater for supplying mulch to the suction intake of a mulch blower having a housing and a rotating bladed rotor therein, said feeder-beater comprising a housing adapted for mounting at the suction intake of such a blower, a plurality of shafts rotatably mounted in the feeder-beater housing and flexible members mounted on the shafts, the flexible members on one shaft being offset with reference to flexible members on other shafts so that they pass each other when the shafts are rotating and feed mulch into the suction intake of the blower, and means for driving the shafts in unison in the same direction, said flexible members being normally held substantially at right angles to their respective shafts by centrifugal force and being deflected by the accumulation of mulch at the blower intake thereby rendering them relatively non-feeding until the accumulation decreases.

2. A feeder-beater as in claim 1 in which two of said shafts are located near the bottom of the feeder-beater housing and another shaft is located above the same and in a vertical plane between said two shafts, the flexible members on certain of said shafts having bars at their outer ends.

3. A feeder-beater as in claim 1 in which the flexible members comprise sections of link chain.

4. A feeder-beater as in claim 3 in which the chain is roller chain.

5. A feeder-beater as in claim 1 in which two of said shafts are located near the bottom of the feeder-beater housing and another shaft is located above the same and in a vertical plane passing between and parallel to said shafts, the flexible members comprising sections of link chain, certain of said flexible members having bars at their outer ends.

6. A feeder-beater as in claim 2 in which the flexible members comprise links of roller chain.

7. A feeder-beater as in claim 2 in which the flexible members on the shafts near the bottom of the feeder-beater housing are provided with rigid bars at the outer ends thereof.

8. A feeder-beater as in claim 2 in which the flexible members consist of lengths of roller chain, the lengths of roller chain on the lowermost shafts having rigid bars at the outer ends thereof and in which the flexible members on the upper shaft consist of roller chain of such length that the arc subscribed by the outer ends thereof is within the arc subscribed by the rigid bars of the other two shafts.

9. A beater-feeder adapted for mounting at the suction intake in the blower fan housing of a blower and to deliver fibres in separated condition and at a rate that is automatically controlled by the resistance of the fibres to separation and to the resistance of an accumulation of fibres at the blower intake; said beater-feeder comprising a feeder-beater housing having an inlet for fibres to be separated and an outlet for delivery of fibres to such blower intake, and a plurality of shafts and rotatable in unison in the same direction, said shafts being supported by the beater-feeder housing and extending transversely thereof and being so spaced and located as to form the corners of a triangle, said shafts having mounted thereon spaced, flexible members that are rotatable to discharge fibre from the beater-feeder outlet and urged to maximum feeding and beating position by centrifugal force and which automatically foreshorten as the flexible members meet with the resistance of fibres accumulating at the outlet of the beater-feeder housing.

10. A beater-feeder as in claim 9 in which the lengths of the flexible members and the spacing thereof are such that they pass each other as they rotate.

11. A beater-feeder as in claim 9 in which the flexible members on said shafts comprise lengths of chain, certain of which carry relatively rigid bars at their outer ends.

12. In combination, a mulch blower having an impeller housing provided with a suction intake for mulch and a blower pipe outlet, and a motor drivable impeller in said impeller housing, and a beater-feeder for receiving bales of fibre, separating and feeding the fibres to the suction intake of the blower at a rate automatically controlled by the accumulation of fibres at such intake, said beater-feeder comprising a beater-feeder housing having a bale input inlet and an outlet connected to the suction inlet of the blower, a plurality of shafts rotatably mounted in the feeder-beater housing and flexible members mounted on the shafts, the flexible members on one shaft being offset with reference to flexible members on other shafts so that they pass each other when the shafts are rotating and mulch is being fed into the suction intake of the blower, and means for driving the shafts in unison in the same direction, said flexible members being normally held substantially at right angles to their respective shafts by centrifugal force and being deflected by the accumulation of mulch at the blower suction intake thereby rendering them relatively non-feeding until the accumulation decreases.

13. A combination as in claim 12 in which two of the shafts of the beater-feeder are located near the bottom of the beater-feeder housing and another shaft is located above the same and in a vertical plane near said two shafts, the flexible members on certain of said shafts having bars at their outer ends.

14. A combination as in claim 12 in which the flexible members of the beater-feeder comprise sections of link chain.

References Cited in the file of this patent
UNITED STATES PATENTS

| | | |
|---|---|---|
| 959,746 | Humason | May 31, 1910 |
| 1,500,581 | Filson | July 8, 1924 |
| 2,531,732 | Hoffman | Nov. 28, 1950 |
| 2,573,227 | Sheeley | Oct. 30, 1951 |
| 2,721,767 | Krapp | Oct. 25, 1955 |
| 2,739,846 | Jacobsen | Mar. 27, 1956 |